United States Patent
Krumm

(10) Patent No.: US 10,391,909 B2
(45) Date of Patent: Aug. 27, 2019

(54) MOTOR VEHICLE HAVING A HEATABLE HEAD RESTRAINT

(71) Applicant: Bayerische Motoren Werke Aktiengesellschaft, Munich (DE)

(72) Inventor: Maximilian Krumm, Landsberg am Lech (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/852,413

(22) Filed: Dec. 22, 2017

(65) Prior Publication Data

US 2018/0118070 A1    May 3, 2018

Related U.S. Application Data

(63) Continuation of application No. PCT/EP2016/064141, filed on Jun. 20, 2016.

(30) Foreign Application Priority Data

Jun. 25, 2016 (DE) .................. 10 2015 211 858

(51) Int. Cl.
*B60N 2/56* (2006.01)
*B60N 2/879* (2018.01)
*B60N 2/809* (2018.01)

(52) U.S. Cl.
CPC .......... *B60N 2/879* (2018.02); *B60N 2/5671* (2013.01); *B60N 2/5685* (2013.01); *B60N 2/809* (2018.02)

(58) Field of Classification Search
CPC .... B60N 2/5671; B60N 2/5685; B60N 2/809; B60N 2/879

(Continued)

(56) References Cited

U.S. PATENT DOCUMENTS 6,580,060 B1* 6/2003 Inman ................. B60N 2/5635
                                                    219/217
6,604,785 B2* 8/2003 Bargheer ........... B60H 1/00285
                                                    297/180.14

(Continued)

FOREIGN PATENT DOCUMENTS

CN    202136069 U    2/2012
DE    100 63 406 A1  5/2002

(Continued)

OTHER PUBLICATIONS

International Search Report (PCT/ISA/210) issued in PCT Application No. PCT/EP2016/064141 dated Sep. 30, 2016 with English translation (six pages).

(Continued)

*Primary Examiner* — Rodney B White
(74) *Attorney, Agent, or Firm* — Crowell & Moring LLP

(57) ABSTRACT

A head restraint for a motor vehicle has devices such as a fan and a heating element such that heated air can flow out of a front side of the head restraint if necessary. The head restraint enables heating of a head by way of outflowing heated air. A passage opening is formed in the cushion body of the head restraint, which passage opening extends from a back side of the cushion body to a front side of the cushion body. A cavity is formed in the passage opening at a distance from the back side and at a distance from the front side of the cushion body, in which cavity at least one fan is arranged. An air-permeable, electrically operated heating mat is provided on the back side of the cushion body in order to heat the suctioned air, and the pre-heated air is additionally heated by an air-permeable, electrically operated heating mat located on the front side of the cushion body.

13 Claims, 1 Drawing Sheet

(58) Field of Classification Search
USPC .................. 297/180.12, 180.13, 180.14
See application file for complete search history.

(56) References Cited

U.S. PATENT DOCUMENTS

| | | | | |
|---|---|---|---|---|
| 6,644,735 B2 * | 11/2003 | Bargheer | ........... | B60H 1/00285 297/180.13 |
| 6,746,076 B2 * | 6/2004 | Bogisch | ............ | B60J 7/223 297/180.14 |
| 6,761,399 B2 * | 7/2004 | Bargheer | ............ | B60N 2/5628 297/180.12 |
| 6,786,545 B2 * | 9/2004 | Bargheer | ............ | B60J 7/223 297/217.3 X |
| 6,897,417 B1 * | 5/2005 | Usselman | ............ | H05B 3/342 219/202 |
| 7,503,625 B2 * | 3/2009 | Bargheer | ............ | B60H 1/3407 297/180.14 |
| 7,581,785 B2 * | 9/2009 | Heckmann | ......... | B60H 1/00407 297/180.12 |
| 7,621,594 B2 * | 11/2009 | Hartmann | .......... | B60H 1/00821 297/180.12 X |
| 7,708,626 B2 * | 5/2010 | Bargheer | ............ | B60N 2/5635 297/217.1 |
| 7,784,863 B2 * | 8/2010 | Fallen | ................ | B60N 2/5621 297/180.14 |
| 7,963,595 B2 * | 6/2011 | Ito | ........................ | B60N 2/809 297/180.14 |
| 8,167,368 B2 * | 5/2012 | Eckel | ................ | B60H 1/00285 297/180.13 |
| 8,220,869 B2 * | 7/2012 | Kolich | ................ | B60N 2/5635 297/180.1 |
| 9,333,888 B2 * | 5/2016 | Helmenstein | ........ | B60N 2/5671 |
| 9,346,384 B2 * | 5/2016 | Zhang | ................ | B60N 2/5657 |
| 9,744,888 B1 * | 8/2017 | Hall | ........................ | B60N 2/06 |
| 2008/0290703 A1 * | 11/2008 | Bargheer | ............ | B60N 2/5621 297/180.14 |
| 2008/0315634 A1 * | 12/2008 | Hartmann | ............ | B60N 2/5635 297/180.14 |
| 2009/0134677 A1 * | 5/2009 | Maly | .................... | B60N 2/5635 297/180.14 |
| 2011/0101741 A1 | 5/2011 | Kolich | | |
| 2014/0152057 A1 * | 6/2014 | Truant | .................... | B60N 2/879 297/180.12 |
| 2015/0375657 A1 * | 12/2015 | Braun | .................... | B60N 3/048 219/202 |

FOREIGN PATENT DOCUMENTS

| | | |
|---|---|---|
| DE | 10 2009 058 890 A1 | 7/2010 |
| DE | 10 2010 042 927 A1 | 5/2011 |
| DE | 10 2012 004 377 A1 | 11/2012 |

OTHER PUBLICATIONS

German-language Written Opinion (PCT/ISA/237) issued in PCT Application No. PCT/EP2016/064141 dated Sep. 30, 2016 (five pages).

German-language Search Report issued in counterpart German Application No. 10 2015 211 858.4 dated Jan. 26, 2016 with partial English translation (12 pages).

* cited by examiner

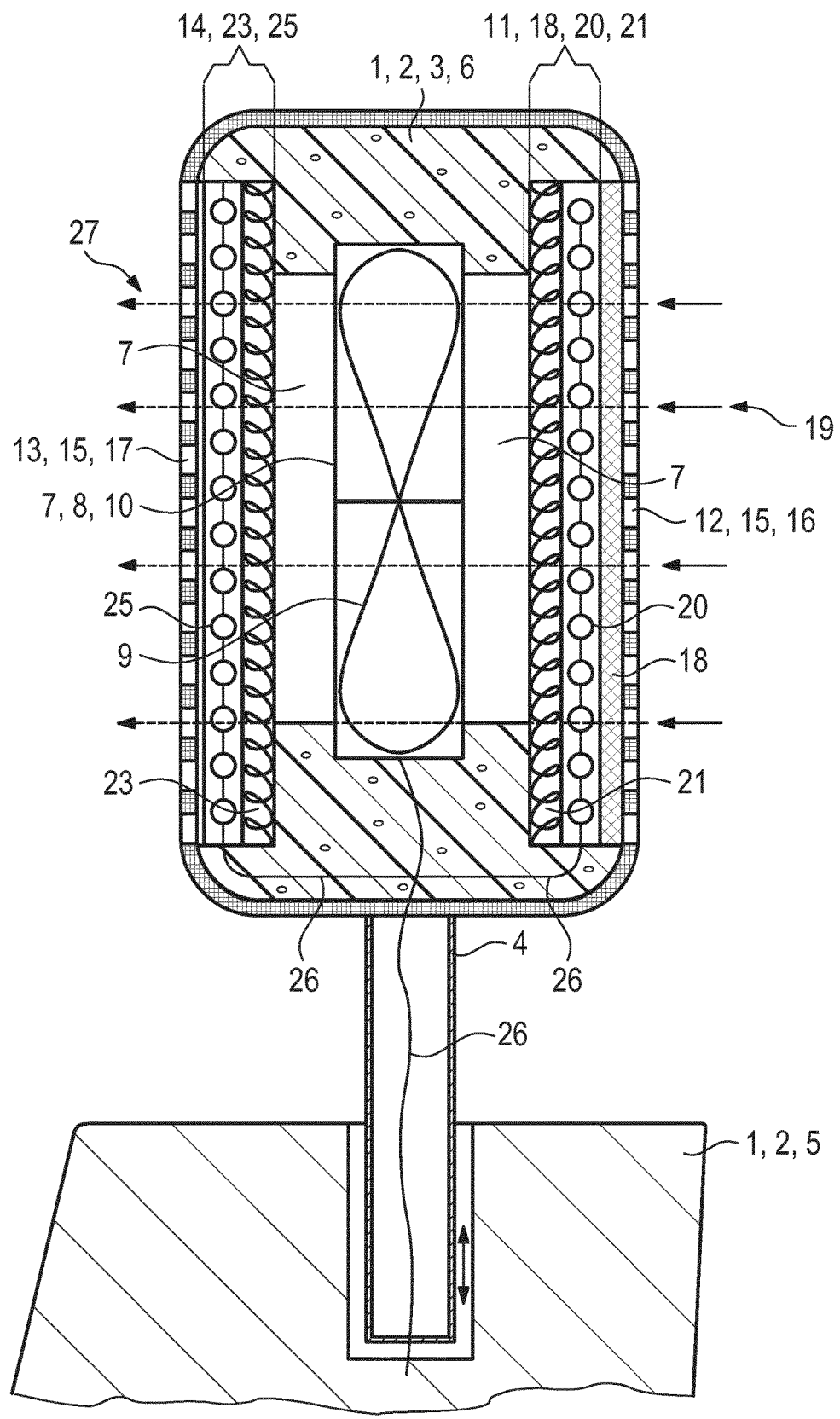

MOTOR VEHICLE HAVING A HEATABLE HEAD RESTRAINT

CROSS REFERENCE TO RELATED APPLICATIONS

This application is a continuation of PCT International Application No. PCT/EP2016/064141, filed Jun. 20, 2016, which claims priority under 35 U.S.C. § 119 from German Patent Application No. 10 2015 211 858.4, filed Jun. 25, 2015, the entire disclosures of which are herein expressly incorporated by reference.

BACKGROUND AND SUMMARY OF THE INVENTION

The invention relates to a motor vehicle, in particular to the head restraint of a seat for a motor vehicle.

A head restraint for a seat of a motor vehicle is already known from DE 10 2012 004 377 A1. The head restraint has a cushion body composed of foam or the like which is covered with a cover. The head restraint is an independent component which is fastenable to a backrest of a vehicle seat in a vertically displaceable manner via two column supports. A power supply can be guided via the column supports to an (axial) fan which is arranged in a cavity of the cushion body. An intake duct is formed on a side member of the head restraint. The fan sucks air out of the passenger compartment into the head restraint via the intake duct. The air taken in is conveyed via the fan to a plurality of heating mats. The heating mats have different surface-related heating capacities. The air heated up by the heating mats flows out on the front side of the head restraint at an upper head contact surface and at a point level with the neck of a person.

It is the object of the invention to provide a head restraint for a seat of a motor vehicle, by means of which heating of a head and adjoining body regions of a seat user located on the motor vehicle seat is made possible by heated air which flows out.

This and other objects are achieved by a vehicle seat with a seat cushion, a backrest and a head restraint arranged on the backrest in a motor vehicle according to the invention. The head restraint has a cushion body which is covered with a cover. A fan is arranged in a cavity of the cushion body of the head restraint. An electric heating device is arranged in front of the fan in the air delivery direction, and therefore air heated via the heating device emerges from a front side of the cushion body in the air delivery direction.

In an advantageous manner, a passage opening is formed in the cushion body of the head restraint, said passage opening passing from a rear side of the cushion body as far as a front side of the cushion body. A cavity in which at least one fan is arranged is formed in the passage opening at a distance from the rear side of the cushion body and at a distance from the front side of the cushion body.

A rear, air-permeable, electrically operated heating mat for heating the sucked-up air is provided on the rear side of the cushion body. The preheated air is additionally heated by the front, air-permeable, electrically operated heating mat located on the front side of the cushion body.

In an advantageous embodiment, the rear electric heating mat located on the rear side of the cushion body is arranged in a rear layered construction.

The rear layered construction advantageously has an air-permeable insulating layer which is arranged on the inner side of the cover. The rear electric heating mat adjoins the air-permeable insulating layer in the direction of the fan. A spacer fabric which is adjacent to the fan lies against the rear electric heating mat.

In an advantageous embodiment, the front electric heating mat located on the front side of the cushion body is arranged in a front layered construction.

In the case of the front layered construction on the front side of the cushion body, a spacer fabric adjacent to the fan is advantageously provided. A front electric heating mat which is arranged on the inner side of the cover adjoins the spacer fabric in the direction of the front side.

In an advantageous embodiment, the front layered construction covers the passage opening on the front side of the cushion body and the rear layered construction covers the passage opening on the rear side of the cushion body.

The fan is advantageously an axial fan or a radial fan.

In an advantageous manner, a control device or a regulating device is provided, by which the heating capacity of the respective heating mat and the delivery capacity of the fan and, therefore, the temperature of the outflowing air and the outflowing quantity of air are adjustable.

In an advantageous embodiment, the cover is composed of an air-permeable and/or an air-impermeable material.

In an advantageous manner, the cover on the rear side of the cushion body and the cover on the front side of the cushion body are provided with passage openings.

Other objects, advantages and novel features of the present invention will become apparent from the following detailed description of one or more preferred embodiments when considered in conjunction with the accompanying drawing.

BRIEF DESCRIPTION OF THE DRAWING

The FIGURE shows a sectional view of a schematically illustrated head restraint according to an embodiment of the invention.

DETAILED DESCRIPTION OF THE DRAWING

Referring to the FIGURE, the head restraint 3 is arranged on a backrest 5 of a motor vehicle seat 2 (not illustrated specifically) of a motor vehicle 1. The head restraint 3 is fastenable to the backrest 5 of the motor vehicle seat 2 in a vertically adjustable manner via two column supports 4. The head restraint 3 has a cushion body 6 composed of a foam or the like.

In the embodiment shown, the cushion body 6 has a passage opening 7. A fan 9 is arranged in a cavity 10 in a central region 8 of the cushion body 6. The fan 9 can be, for example, an axial fan or a radial fan. The cavity 10 is formed within the passage opening 7.

On a rear side 12 of the cushion body 6, the passage opening 7 is covered by a layered construction 11. On the front side 13 of the cushion body 6 opposite the rear side 12, the passage opening 7 is covered by a further layered construction 14. A cover 15 is arranged around the cushion body 6. The cover 15 is provided with passage openings 16, 17 on the rear side 12 and the front side 13 of the cushion body 6.

The rear layered construction 11 on the rear side 12 of the cushion body 6 has, following the cover 15, an air-permeable layer 18 which firstly lets through the air 19 taken in by the fan and secondly brings about heat insulation. The air-permeable layer 18 can be composed, for example, of an open-pored material or of fibers. In another embodiment, air permeability is produced by the fact that a non-air-permeable insulation material is perforated. The air flow direction and air delivery direction of the air 19 taken in is illustrated symbolically by way of arrows.

An electric heating mat 20 adjoins the air-permeable layer 18. In the embodiment shown, an air-permeable spacer fabric 21 follows the electric heating mat 20. The spacer fabric 21 has elastic compressibility which is similar as in the case of a foam. In another embodiment, an air-permeable foam is used instead of the spacer fabric 21.

The front layered construction 14 on the front side 13 of the cushion body 6 has, following the cover 15, a second electric and air-permeable or perforated heating mat 25. In the embodiment shown, a spacer fabric 23 follows the second electric and air-permeable or perforated front heating mat 25. In another embodiment, an air-permeable foam is used instead of the spacer fabric 23. The air flow direction and air delivery direction of the outflowing and heated air 27 is illustrated symbolically by way of arrows.

Power is supplied to the fan 9 and the two electric heating mats 20 and 25 by way of lines 26 which, for example, by way of a seat cable harness, are introduced through the backrest 5 and the column supports 4 into the cushion body 6.

Furthermore, in one embodiment, a control device or a regulating device (not illustrated) is provided, by which the heating capacity of the respective heating mat and the delivery capacity of the fan and, therefore, the temperature of the outflowing air and the outflowing quantity of air are adjustable.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle head restraint for a vehicle seat having a seat cushion and a backrest on which the head restraint is arranged, the head restraint comprising:
    a cushion body having a passage opening formed therein, the passage opening passing from a rear side of the cushion body to a front side of the cushion body;
    a cover for the cushion body;
    at least one fan arranged in a cavity formed in the passage opening, the cavity being at a distance from the rear side and at a distance from the front side of the cushion body;
    a rear, air-permeable, electrically operated heating mat provided on the rear side of the cushion body, the rear heating mat being configured to heat suctioned air; and
    a front, air-permeable, electrically operated heating mat provided on the front side of the cushion body, wherein suctioned air preheated via the rear heating mat is additionally heated via the front heating mat.

2. The motor vehicle head restraint as claimed in claim 1, wherein
    the rear heating mat located on the rear side of the cushion body is arranged in a rear layered construction.

3. The motor vehicle head restraint as claimed in claim 2, wherein
    the rear layered construction has an air-permeable insulating layer which adjoins an inner side of the cover,
    the rear heating mat adjoins the air-permeable insulating layer in the direction of the fan, and
    a spacer fabric or an air-permeable foam, which is adjacent to the fan, lies against the rear heating mat.

4. The motor vehicle head restraint as claimed in claim 3, wherein
    the front heating mat located on the front side of the cushion body is arranged in a layered construction.

5. The motor vehicle head restraint as claimed in claim 4, wherein
    the rear layered construction covers the passage opening on the rear side of the cushion body, and
    the front layered construction covers the passage opening on the front side of the cushion body.

6. The motor vehicle head restraint as claimed in claim 4, wherein
    the front layered construction on the front side of the cushion body has a spacer fabric adjacent to the fan, and
    the front heating mat which is arranged on the inner side of the cover adjoins a spacer fabric or an air-permeable foam in the direction of the front side.

7. The motor vehicle head restraint as claimed in claim 1, wherein
    the front heating mat located on the front side of the cushion body is arranged in a layered construction.

8. The motor vehicle head restraint as claimed in claim 7, wherein
    the front layered construction on the front side of the cushion body has a spacer fabric adjacent to the fan, and
    the front heating mat which is arranged on the inner side of the cover adjoins a spacer fabric or an air-permeable foam in the direction of the front side.

9. The motor vehicle head restraint as claimed in claim 1, wherein the fan is an axial fan or a radial fan.

10. The motor vehicle head restraint as claimed in claim 1, further comprising:
    a control device or a regulating device, by which a heating capacity of a respective heating mat and a delivery capacity of the fan and, therefore, a temperature of outflowing air and an outflowing quantity of air are adjustable.

11. The motor vehicle head restraint as claimed in claim 1, wherein the cover is composed of an air-permeable and/or an air-impermeable material.

12. The motor vehicle head restraint as claimed in claim 11, wherein the cover on the rear side of the cushion body and the cover on the front side of the cushion body are provided with passage openings.

13. The motor vehicle head restraint as claimed in claim 1, wherein the front heating mat and the rear heating mat are spaced apart from each other.

* * * * *